US011900471B1

(12) United States Patent
Lundsgaard et al.

(10) Patent No.: US 11,900,471 B1
(45) Date of Patent: *Feb. 13, 2024

(54) SYSTEM FOR MONITORING AND USING DATA INDICATIVE OF DRIVER CHARACTERISTICS BASED ON SENSORS

(71) Applicant: Allstate Insurance Company, Northbrook, IL (US)

(72) Inventors: Soren K Lundsgaard, Inverness, IL (US); Tara Cavallaro Kozlowski, Geneva, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/346,471

(22) Filed: Jun. 14, 2021

Related U.S. Application Data

(63) Continuation of application No. 15/145,253, filed on May 3, 2016, now Pat. No. 11,055,785.

(51) Int. Cl.
*G06Q 40/00* (2023.01)
*G06Q 40/08* (2012.01)
(Continued)

(52) U.S. Cl.
CPC ............ *G06Q 40/08* (2013.01); *G01C 21/34* (2013.01); *G06Q 10/1095* (2013.01); *G06Q 40/00* (2013.01)

(58) Field of Classification Search
CPC ..................................................... G06Q 40/08
See application file for complete search history.

(56) References Cited

U.S. PATENT DOCUMENTS

| 5,987,377 A * | 11/1999 | Westerlage ............ G08G 1/202 701/465 |
| 6,144,917 A | 11/2000 | Walters et al. |

(Continued)

FOREIGN PATENT DOCUMENTS

| WO | 2012167319 A1 | 12/2012 |
| WO | 2013034953 A1 | 3/2013 |
| WO | 2014106617 A1 | 7/2014 |

OTHER PUBLICATIONS

Vehicle Route Prediction and Time of Arrival Estimation Techniques for Improved Transportation System Management (Year: 2002).*

(Continued)

*Primary Examiner* — Bruce I Ebersman
*Assistant Examiner* — John A Anderson
(74) *Attorney, Agent, or Firm* — Dinsmore & Shohl LLP

(57) ABSTRACT

Aspects of the disclosure relate to a system and method for electronically monitoring and using data indicative of driver characteristics based on sensors. For example, the system may determine an origin associated with a user, a destination associated with the user, and a desired arrival time at the destination. A driving characteristic computing device of the system may determine an estimate for a duration of a trip from the origin to the destination. Based on the estimate for the duration and the desired arrival time at the destination, the driving characteristic computing device may determine a recommended departure time from the origin for the user. Based on sensor data, the system may determine a departure time from the origin for the user. The driving characteristic computing device may compare the departure time to the recommended departure time, and a value of a property of insurance for the user may be determined based on the comparing.

20 Claims, 6 Drawing Sheets

(51) Int. Cl.
  *G01C 21/34* (2006.01)
  *G06Q 10/1093* (2023.01)

(56) References Cited

U.S. PATENT DOCUMENTS

| | | | |
|---|---|---|---|
| 8,311,858 B2 | 11/2012 | Everett et al. | |
| 8,799,032 B2 | 8/2014 | Fernandes et al. | |
| 9,037,405 B2 | 5/2015 | Gourlay et al. | |
| 9,140,570 B1* | 9/2015 | Baird | G01C 21/3682 |
| 9,141,995 B1 | 9/2015 | Brinkmann et al. | |
| 10,042,359 B1* | 8/2018 | Konrardy | G07C 9/00563 |
| 10,309,795 B2 | 6/2019 | Konig et al. | |
| 2005/0154626 A1 | 7/2005 | Jones | |
| 2006/0059023 A1 | 3/2006 | Mashinsky | |
| 2006/0253307 A1 | 11/2006 | Warren et al. | |
| 2011/0099040 A1 | 4/2011 | Felt et al. | |
| 2011/0106370 A1 | 5/2011 | Duddle et al. | |
| 2012/0226440 A1 | 9/2012 | Nagda | |
| 2013/0085818 A1 | 4/2013 | Gore et al. | |
| 2013/0164714 A1 | 6/2013 | Hunt et al. | |
| 2014/0046701 A1 | 2/2014 | Steinberg et al. | |
| 2014/0156327 A1 | 6/2014 | Cai | |
| 2014/0257863 A1 | 9/2014 | Maastricht et al. | |
| 2014/0278086 A1* | 9/2014 | San Filippo | G01C 21/3423 701/527 |
| 2014/0278574 A1 | 9/2014 | Barber | |
| 2016/0189311 A1* | 6/2016 | Erickson | B60K 35/00 705/4 |
| 2017/0255966 A1 | 9/2017 | Khoury | |
| 2019/0316926 A1 | 10/2019 | Wang | |

OTHER PUBLICATIONS

An advanced pre-trip planner with personalized information on transit networks with ATIS (Year: 2013).*
"TaxiCab Application: Tailor-made Application for Building Taxicab Business;" NDOT Technologies PVT Ltd.
"Drive Smart;" New York City DOT; http://nyc.gov/dot.
"Azuga Driver Rewards Program;" http://www.azuga.com/driver-rewards.
Tierney, Jim, "Allstate's Drivewise and Allstate Rewards Loyalty Program Sparks Customer Engagement;" Loyalty360; http://www.loyalty360.org/resources/article/allstates-drivewise-and-allstate-rewards-loyalty-program.

* cited by examiner

SYSTEM FOR MONITORING AND USING DATA INDICATIVE OF DRIVER CHARACTERISTICS BASED ON SENSORS

CROSS-REFERENCE TO RELATED APPLICATIONS

This application is a continuation of U.S. patent application Ser. No. 15/145,253, filed May 3, 2016, which is incorporated by reference herein.

TECHNICAL FIELD

Aspects of the disclosure generally relate to electronically monitoring and using data indicative of driver characteristics based on sensors.

BACKGROUND

Drivers may have to drive to numerous locations, such as on a daily basis (e.g., driving to school or work or driving home), for appointments (e.g., doctor's appointments), or for other events. However, drivers are often rushed for time and may depart for those events late and/or arrive late. Late departures or arrivals often lead to risky driving behavior, such as speeding, and risky driving behavior may lead to, for example, car crashes.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to a system and method for electronically monitoring and using data indicative of driver characteristics based on sensors. For example, the system may determine an origin associated with a user, a destination associated with the user, and a desired arrival time at the destination. A driving characteristic computing device of the system may determine an estimate for a duration of a trip from the origin to the destination. Based on the estimate for the duration and the desired arrival time at the destination, the driving characteristic computing device may determine a recommended departure time from the origin for the user. Based on sensor data, the system may determine a departure time from the origin for the user. The driving characteristic computing device may compare the departure time to the recommended departure time, and a value of a property of insurance for the user may be determined based on the comparing.

In some aspects, determining the destination associated with the user may comprise accessing a calendar appointment on an electronic calendar associated with the user. Systems and methods described herein may comprise receiving data from a vehicle associated with the trip from the origin to the destination. The data may be indicative of one or more of a fuel level of the vehicle or a battery level of the vehicle. In response to determining that the one or more of the fuel level of the vehicle or the battery level of the vehicle is less than a threshold, it may be determined that the vehicle will stop during the trip for refueling or recharging. Determining the estimate for the duration of the trip may be based on the determining that the vehicle will stop during the trip for refueling or recharging.

In some aspects, determining the value of the property of insurance may comprise increasing the value of the property of insurance in response to determining that the departure time is after the recommended departure time. In additional or alternative aspects, determining the value of the property of insurance may comprise decreasing the value of the property of insurance in response to determining that the departure time is at or prior to the recommended departure time.

In some aspects, the property of insurance may comprise a risk score or an insurance premium associated with the user. In various aspects described herein, prior to the recommended departure time, a notification may be generated for the user, the notification indicating a first value of the property of insurance if the user departs the origin at or before the recommended departure time and a second value of the property of insurance if the user departs the origin after the recommended departure time.

In some aspects, sensor data may be used to determine an arrival time of the user at the destination. A driving characteristic computing device may compare the arrival time to the desired arrival time at the destination. Determining the value of the property of insurance for the user may be based on the comparing the arrival time to the desired arrival time.

In some aspects, at least a portion of a recommended driving route for the trip may be determined. Position sensor data may be used to determine at least a portion of a driving route taken by the user. A driving characteristic computing device may compare the at least the portion of the recommended driving route to the at least the portion of the driving route taken by the user. Determining the value of the property of insurance for the user may be based on the comparing the at least the portion of the recommended driving route to the at least the portion of the driving route taken by the user.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Aspects may take the form of a computing device configured to perform specified actions. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
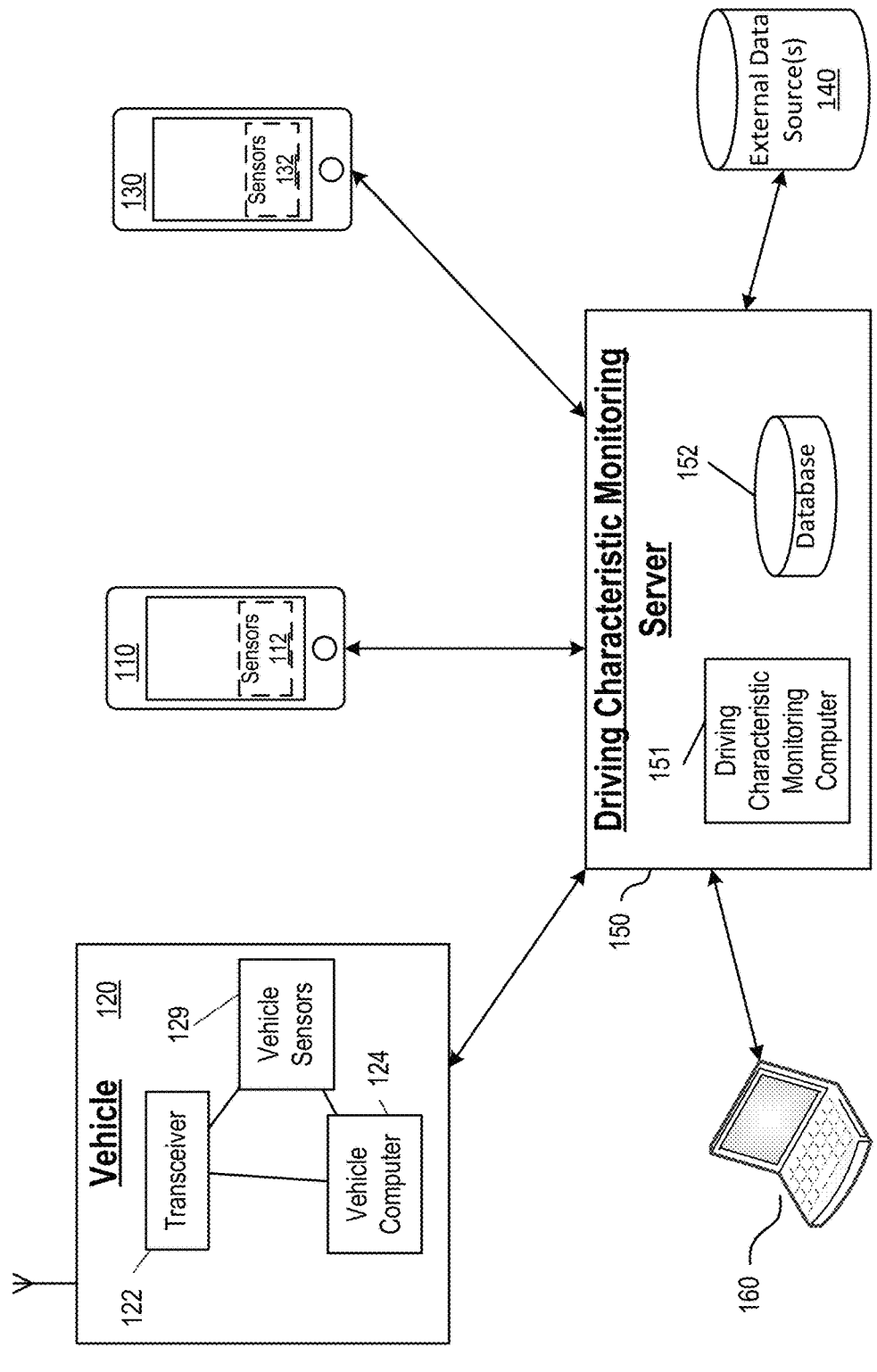
FIG. 1 is a diagram illustrating various example components of a system for determining departure times, arrival times, and/or other driving characteristics based on sensor data according to one or more aspects of the disclosure.

FIG. 1 is a diagram illustrating various example components of a system 100 for determining departure times, arrival times, and/or other driving characteristics based on sensor data according to one or more aspects of the disclosure. The driving characteristic monitoring system 100 may include one or more mobile devices 110 or 130 (e.g., a smartphone, a tablet, and the like), one or more vehicles 120, one or more external data source(s) 140, a driving characteristic monitoring server 150, one or more user devices 160, and additional related components. Each component of the driving characteristic monitoring system 100 may include a computing device (or system) having some or all of the following structural components.

For example, the driving characteristic monitoring computer or computing device 151 may have a processor for controlling overall operation of the computing device 151 and its associated components, including RAM, ROM, input/output module, and memory. The computing device 151, along with one or more additional devices, may correspond to any of multiple systems or devices, such as driving characteristic monitoring computing devices or systems, configured as described herein for determining departure times, arrival times, and/or other driving characteristics.

The driving characteristic monitoring computer 151 may include an Input/Output (I/O) module having a microphone, keypad, touch screen, and/or stylus through which a user of the computing device 151 may provide input, and may also include one or more of a speaker for providing audio input/output and a video display device for providing textual, audiovisual and/or graphical output. Software may be stored within the memory of the driving characteristic monitoring computer and/or other storage to provide instructions to its processor for enabling device 151 to perform various functions. For example, the computing device's memory may store software used by the device 151, such as an operating system, application programs, and an associated internal or external database 152. The memory unit may include one or more of volatile and/or non-volatile computer memory to store computer-executable instructions, data, and/or other information. The processor of the computer 151 and its associated components may allow the driving characteristic monitoring computer 151 to execute a series of computer-readable instructions to determine departure times, arrival times, and/or other driving characteristics. One or more application programs used by the driving characteristic monitoring computing device 151 may include computer executable instructions (e.g., driving characteristic monitoring programs, and the like) for monitoring driving characteristics and performing other related functions as described herein.

The driving characteristic monitoring computing device 151 may operate in a networked environment supporting connections to one or more remote computers, such as various other terminals/devices (e.g., user device 160, which may include a display). The driving characteristic monitoring computing device 151, and the related terminals/devices, may communicate with vehicles 120, mobile devices 110 and/or 130, external data sources 140, and/or user devices 160. Thus, the driving characteristic monitoring computing device 151 and its associated terminals/devices may each include personal computers (e.g., laptop, desktop, or tablet computers) and/or servers (e.g., web servers, database servers) and may communicate with mobile communication devices (e.g., mobile phones, portable computing devices, and the like).

The devices illustrated in system 100 may communicate via network connections depicted such as a local area network (LAN) and a wide area network (WAN), and a wireless telecommunications network, but may also include other networks. When used in a LAN networking environment, the driving characteristic monitoring computing device 151 may be connected to the LAN through a network interface or adapter. When used in a WAN networking environment, the device 151 may include a modem or other means for establishing communications over the WAN, such as a network (e.g., the Internet). When used in a wireless telecommunications network, the device 151 may include one or more transceivers, digital signal processors, and additional circuitry and software for communicating with wireless computing devices (e.g., mobile phones, vehicles, etc.) via one or more network devices (e.g., base transceiver stations) in the wireless network. It will be appreciated that the network connections shown and described above are illustrative and other means of establishing a communications link between the computers may be used. The existence of any of various network protocols such as TCP/IP, Ethernet, FTP, HTTP and the like, and of various wireless communication technologies such as GSM, CDMA, LTE, Wi-Fi, and WiMAX, is presumed, and the various computing devices and driving characteristic monitoring system components described herein may be configured to communicate using any of these network protocols or technologies.

The system 100 may also include a vehicle 120, containing some or all of the hardware/software components of the computing device 151 described above. The vehicle 120 may be, for example, an automobile, motorcycle, scooter, bus, recreational vehicle, boat, or other vehicle for which sensor data may be collected and analyzed. The vehicle computer 124 may receive sensor data from sensors 129 of the vehicle 120. For example, vehicle computer 124 may receive accelerometer data from an accelerometer in the vehicle 120. Sensors 129 may include, for example, telematics devices integrated with the vehicle 120 and/or aftermarket telematics devices. The telematics devices may be used to track location, vehicle diagnostics, speed, acceleration, rotation, and the like. In some aspects, the aftermarket telematics devices may be connected to the vehicle by wire, such as via the vehicle's OBD port. Aftermarket devices may additionally or alternatively connect to the vehicle (or other devices within the vehicle, such as a mobile device) wirelessly.

The vehicle 120 may include a communication system 122. The communication system 122 may comprise a short-range transceiver, such as a vehicle-based data transmission system, configured to transmit vehicle data to other nearby vehicles, and to receive vehicle data from other nearby vehicles. In some examples, the transceiver 122 may use the dedicated short-range communications (DSRC) protocols and standards to perform wireless communications between vehicles. In the United States, 75 MHz in the 5.850-5.925 GHz band have been allocated for DSRC systems and applications, and various other DSRC allocations have been defined in other countries and jurisdictions. However, the communication system 122 need not use DSRC, and may be implemented using other short-range wireless protocols in other examples, such as WLAN communication protocols (e.g., IEEE 802.11), Bluetooth (e.g., IEEE 802.15.1), or one or more of the Communication Access for Land Mobiles (CALM) wireless communication protocols and air interfaces.

The vehicle-to-vehicle (V2V) transmissions between the communication system 122 and another vehicle's communication system may be sent via DSRC, Bluetooth, satellite, GSM infrared, LTE, IEEE 802.11, WiMAX, RFID, and/or any suitable wireless communication media, standards, and protocols. In certain systems, the communication system 122 may include specialized hardware installed in vehicle 120 (e.g., transceivers, antennas, etc.), while in other examples the communication system 122 may be implemented using existing vehicle hardware components (e.g., radio and satellite equipment, navigation computers).

The range of V2V communications between vehicle communication systems may depend on the wireless communication standards and protocols used, the transmission/reception hardware (e.g., transceivers, power sources, antennas), and other factors. Short-range V2V communications may range from just a few feet to many miles. V2V communications also may include vehicle-to-infrastructure (V2I) communications, such as transmissions from vehicles to non-vehicle receiving devices, for example, toll booths, rail road crossings, and road-side traffic monitoring devices. Certain V2V communication systems may periodically broadcast data from a vehicle 120 to any other vehicle, or other infrastructure device capable of receiving the communication, within the range of the vehicle's transmission capabilities. For example, a vehicle 120 may periodically broadcast (e.g., every 0.1 second, every 0.5 seconds, every second, every 5 seconds, etc.) certain vehicle data via its short-range communication system 122, regardless of whether or not any other vehicles or reception devices are in range. In other examples, a vehicle communication system 122 may first detect nearby vehicles and receiving devices, and may initialize communication with each by performing a handshaking transaction before beginning to transmit its vehicle data to the other vehicles and/or devices.

The types of vehicle data transmitted by the vehicle 120 may depend on the protocols and standards used for the V2V communication, the range of communications, and other factors. In certain examples, the vehicle 120 may periodically broadcast corresponding sets of similar vehicle driving data, such as the location (which may include an absolute location in GPS coordinates or other coordinate systems, and/or a relative location with respect to another vehicle or a fixed point), speed, and direction of travel. In certain examples, the nodes in a V2V communication system (e.g., vehicles and other reception devices) may use internal clocks with synchronized time signals, and may send transmission times within V2V communications, so that the receiver may calculate its distance from the transmitting node based on the difference between the transmission time and the reception time. The state or usage of the vehicle's 120 controls and instruments may also be transmitted, for example, whether the vehicle is accelerating, braking, turning, and by how much, and/or which of the vehicle's instruments are currently activated by the driver (e.g., head lights, turn signals, hazard lights, cruise control, 4-wheel drive, traction control, windshield wipers, etc.). Vehicle warnings such as detection by the vehicle's 120 internal systems that the vehicle is skidding, that an impact has occurred, or that the vehicle's airbags have been deployed, also may be transmitted in V2V communications.

The vehicle 120 may transmit data from its sensors (e.g., vehicle sensors 129) to the driving characteristic monitoring server 150 via the transceiver 122. Exemplary sensor data include speed data (e.g., from a speedometer of the vehicle 120), acceleration data (e.g., from an accelerometer of the vehicle 120), vehicle operation data (e.g., from a microcomputer of the vehicle 120), rotational data (e.g., from a gyroscope of the vehicle 120), GPS data (e.g., from a GPS device of the vehicle 120), cellular or other wireless data (e.g., from a transceiver of the vehicle 120), or any other sensor data. As described above, the transceiver 122 may comprise a short-range transceiver. Additionally or alternatively, the transceiver 122 may comprise a long-range transceiver, such as a cellular signal transceiver, or any other type of long-range transceiver.

The system 100 may include one or more mobile computing device 110 or 130 (e.g., mobile phones, personal digital assistants (PDAs), tablet computers, laptop computers, smartwatches, etc.). The mobile computing device 110 may contain some or all of the hardware/software components of the computing device 151 described above. Software applications may be installed on and execute on the mobile device 110 or 130. The software applications may be configured to receive sensor data from internal sensors 112 or 132, such as acceleration, velocity, location, rotation, and the like. For example, mobile device 110 equipped with Global Positioning System (GPS) functionality may determine vehicle location, speed, direction and other driving data and might not need to communicate with vehicle sensors or external vehicle systems for the data. In some examples, the software application on the mobile device 110 may be configured to receive some or all of the sensed data collected by sensors 129 of the vehicle 120.

When mobile computing device 110 is within the vehicle 120, the mobile computing device 110 may be used to sense vehicle data. The mobile computing device 110 may store, analyze, and/or transmit the vehicle data to one or more other computing devices. For example, mobile device 110 may transmit vehicle data directly to driving characteristic monitoring server 150, and thus may be used instead of or in addition to sensors or communication systems of the vehicle 120.

The mobile device 110 may include various sensors 112 capable of detecting and recording conditions at and operational parameters of the vehicle 120 if the mobile device 110 is inside the vehicle. The sensors 112 may be used to sense, for example, the location of the mobile device 110, such as the GPS coordinates (e.g., latitude and longitude). The location of the mobile device 110 may also be determined based on wireless networks the mobile device has connected to, such as Wi-Fi networks, cellular networks, and the like.

The sensors 112 of the mobile device 110, such as a GPS and/or a compass, may sense the speed and/or direction at which the mobile device 110 and accordingly vehicle 120 is traveling. An accelerometer of the mobile device 110 may sense the acceleration of the mobile device. A gyroscope may be used to determine the orientation of the mobile device. The gyroscope may also be used to measure the speed of rotation of the mobile device 110. A magnetometer may be used to measure the strength and direction of the magnetic field relative to the mobile device. The sensors 112 previously described are exemplary, and the mobile device 110 may include any other sensors used for monitoring driving characteristics.

The system 100 may comprise one or more external data sources 140. Each external data source 140 may comprise one or more database storing road condition data indicative of road conditions that might affect travel on a particular driving route, such as traffic accidents, backups, road construction, weather conditions, and the like. Data from the external data sources 140 may be accessed by the server 150 via, for example, open application program interfaces (APIs), databases, software development kits (SDKs), and/or mobile device to mobile device communication.

Figure 2:
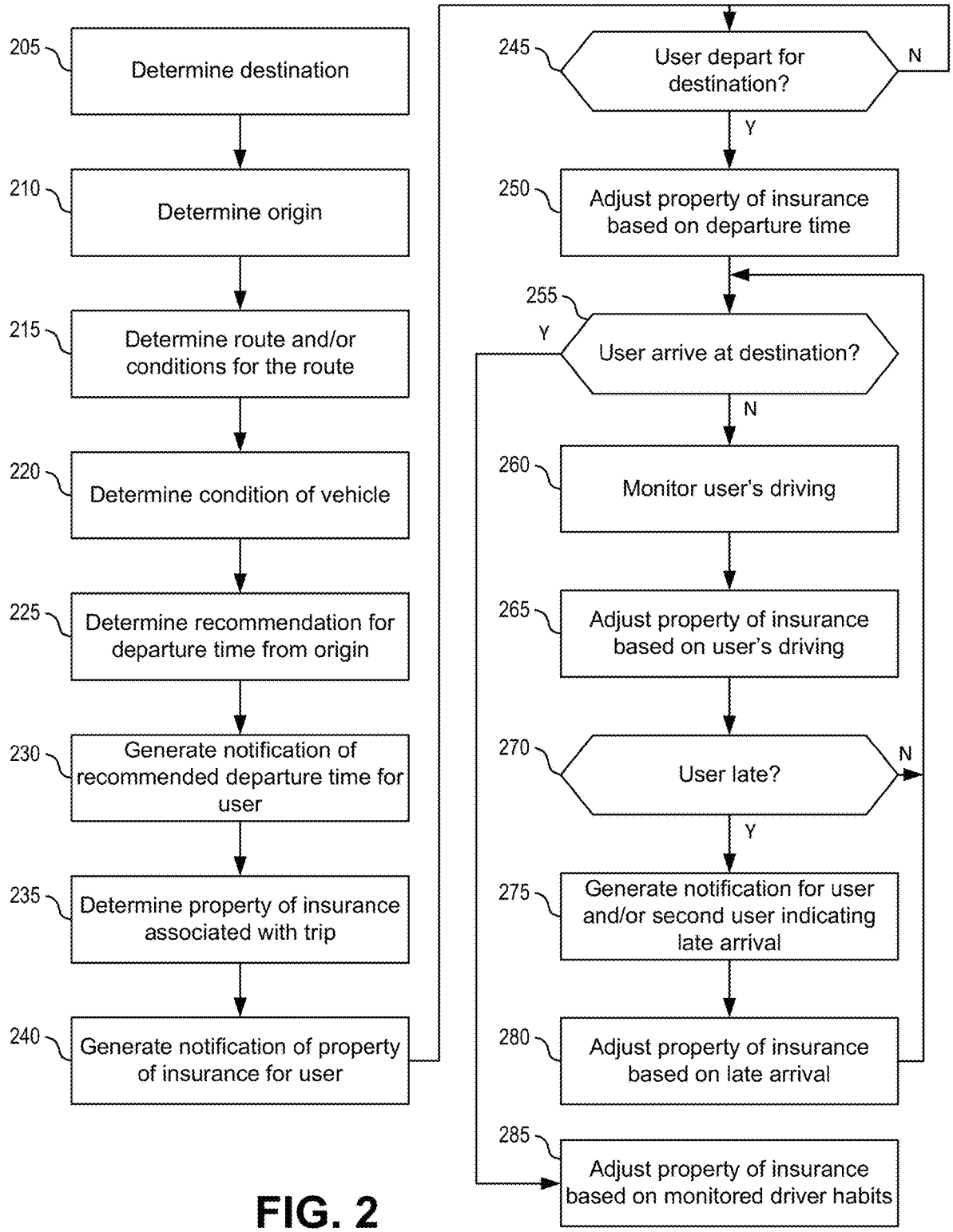
FIG. 2 is a flow diagram illustrating an example method of determining departure times, arrival times, and/or other driving characteristics based on sensor data according to one or more aspects of the disclosure.

FIG. 2 is a flow diagram illustrating an example method of determining departure times, arrival times, and/or other driving characteristics based on sensor data according to one or more aspects of the disclosure. The steps illustrated in FIG. 2 may be performed by one or more of the devices illustrated in FIG. 1, such as the mobile device 110, the driving characteristic monitoring server 150, or other computing devices.

In step 205, a computing device (e.g., the mobile device 110, another user device 160, and/or the driving characteristic monitoring server 150) may determine a destination of a user. The user may input the destination on a user device (e.g., mobile device 110 or other user device 160) via a graphical user interface displayed on the user device, such as via an application running on the user device (e.g., a trip planning application). For example, the user may input a city, an address, a point of interest, and the like. The user may also input a desired arrival time at the destination. Additionally or alternatively, the computing device may access one or more of the user's electronic calendars, which may communicate with (or otherwise be tied to) the application running on the user device. The computing device may retrieve one or more calendar appointments from the user's electronic calendar. The computing device may determine the destination from the calendar appointment and/or a desired arrival time at the destination.

In some aspects, the computing device may predict the user's destination and/or desired arrival time at the destination. For example, the user may opt in to allow the computing device to monitor the user's movement, such as by monitoring the location of the user's mobile device 110 and/or the location of the user's vehicle 120. The location of the mobile device 110 or the vehicle 120 may be determined using GPS, cellular signals, or other wireless signals. The user's movement may be monitored over time, and the computing device may use the user's past movement to predict the user's destination and/or desired arrival time. For example, if the user regularly (e.g., every day or the majority of days in the week) drives from a first location (e.g., home) to a second location (e.g., work), the computing device may predict that the user will drive from the first location to the second location at or about the same time in the future as the driver routinely did in the past. That is, the computing device may use machine learning and/or heuristics to determine the user's travel pattern and to predict future travel destinations and/or arrival times.

In step 210, the computing device may determine an origin of the user, such as the user's starting location for a trip to the destination determined in step 205. The computing device may determine the user's origin in a manner similar to determining the user's destination (e.g., via user input, via the user's electronic calendar(s), as a prediction of the user's origin based on the user's historical location, etc.). The computing device may additionally or alternatively determine the user's current location based on GPS signals, Wi-Fi signals, cellular signals, or other wireless signals received or sent by the user's mobile device 110. The computing device may set the user's current location to the user's origin.

In step 215, the computing device may determine one or more routes for the user to drive from the origin determined in step 210 to the destination determined in step 205. The computing device may determine road conditions that might affect travel on the route, such as traffic accidents, backups, road construction, weather conditions, and the like. The computing device may use, for example, a risk map to determine safe driving routes. The risk map may be used for scoring driving based on historical risk of driving certain areas or routes at certain times. The computing device may also determine an estimate for a time duration for the user to drive to the destination (e.g., based on the road conditions).

In step 220, the computing device may determine a condition of the user's vehicle. The computing device may communicate (e.g., wirelessly or via a wired connection) with one or more sensors of the vehicle to determine the vehicle's condition. For example, the computing device may receive sensor data indicating the level of fuel or the battery level of the vehicle (which may be a gas vehicle, electric vehicle, or hybrid vehicle). In response to receiving the fuel or battery level data, the computing device may determine whether the driver will stop during the trip to add fuel to the vehicle and/or charge the vehicle's batteries, such as if the fuel or battery level is below a threshold level. The computing device may determine the amount of time that the stop is expected to take, such as 5 minutes to refuel or 30 minutes to charge the vehicle. As will be described below, the computing device may factor the expected stop into the driver's trip.

In step 225, the computing device may determine a recommendation for a departure time from the origin, such that the driver will arrive at the destination on time. The computing device may determine an estimate for the amount of time to drive from the origin to the destination based on the route and/or route conditions determined in step 215 (e.g., traffic, weather, and the like). The computing device may additionally factor in the condition of the vehicle determined in step 220 (e.g., fuel and/or battery level) to determine the amount of time to arrive at the destination. For example, if the driver is expected to add fuel to the vehicle during the trip, the computing device may add five minutes (or any other length of time) to the estimate for the duration of the trip. The computing device may similarly determine the number of other stops the driver is expected to make, such as for dinner, for a bio break, at a rest stop, and the like. The computing device may predict the number of stops (and their duration) if the trip is over a certain (configurable) length or if the trip is set to go during a certain time of day (e.g., dinnertime). In some examples, the estimate for the trip time may be based on historical telematics data particular to the driver and/or vehicle. For example, if the driver historically drives slower than the posted speed limit by a threshold amount, the computing device may increase the estimate for the duration of the trip. On the other hand, if the driver historically drives faster than the posted speed limit by a threshold amount, the computing device may decrease the estimate for the duration of the trip. As another example, if the driver historically is more risky than other drivers (e.g., the driver has more accidents and/or claims than other drivers), the computing device may increase the estimate for the duration of the trip (e.g., increase by 5 minutes). By increasing the estimate, the driver might be less risky because the driver has more time to arrive at the destination (e.g., an additional 5 minutes).

Figure 4:
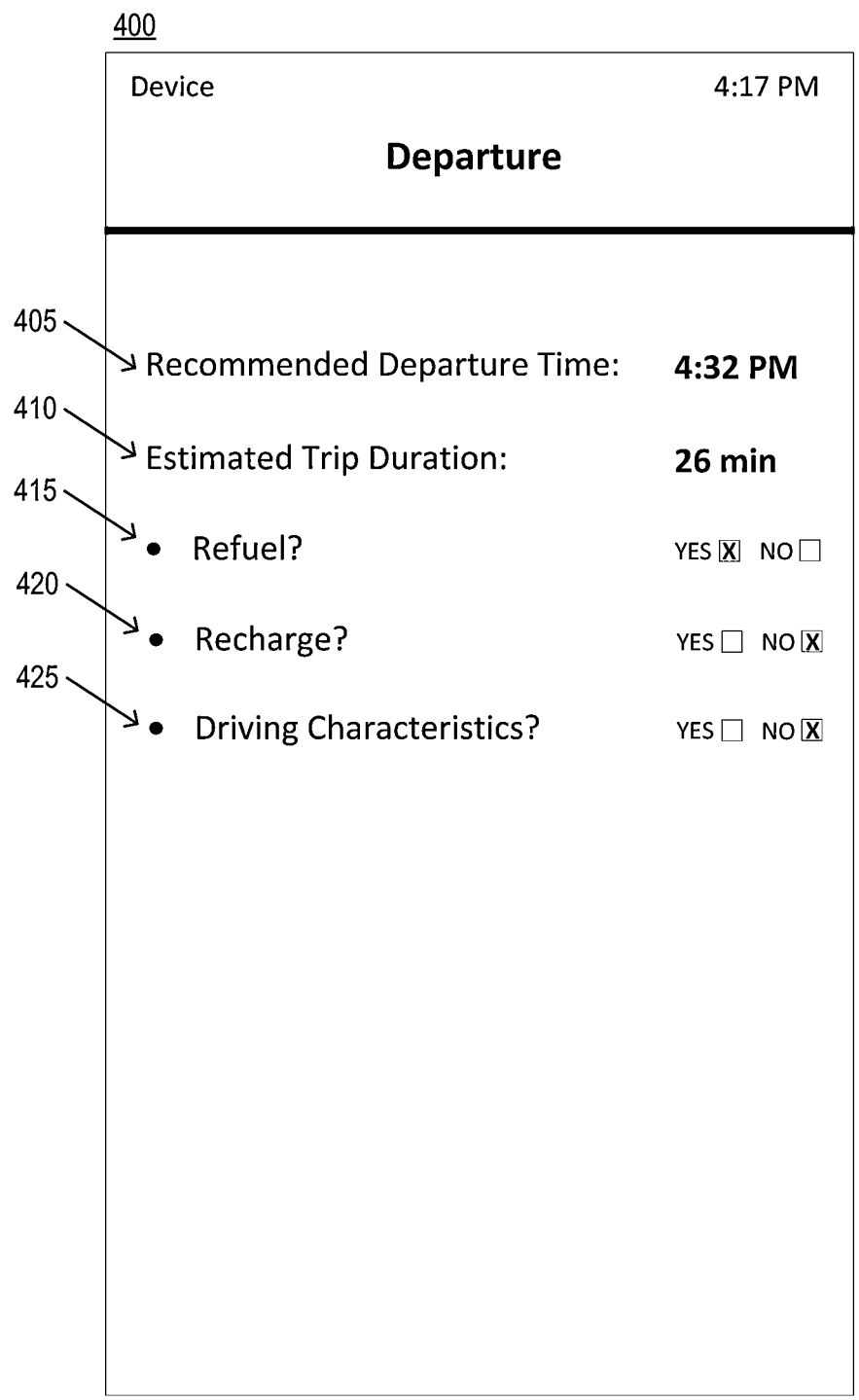
FIG. 4 illustrates an example of a user interface for displaying a recommended departure time according to one or more aspects of the disclosure.

In step 230, the computing device may generate a notification of the recommended departure time for the driver. For example, the server 150 may generate the notification and send the notification to the user's mobile device 110 or other user device 160. FIG. 4 illustrates an example of a user interface 400 for displaying a recommended departure time according to one or more aspects of the disclosure. The mobile device 110 or other user device 160 may display or otherwise indicate to the user (e.g., audibly via a speaker or tactile via a vibration motor) the recommended departure time (e.g., 405). The recommended departure time may be indicated to the user a threshold amount of time prior to the recommended departure time (e.g., 5 minutes before, 10 minutes before, etc.). For example, the driver may receive a warning of when the driver should leave. By notifying the driver when he or she should leave, the risk of accidents or anxiety or concern caused by the driver leaving late and attempting to arrive at the destination on time may be reduced.

The notification may indicate the estimated amount of time to arrive at the destination (e.g., estimated trip duration 410) and/or indicate to the user the recommended departure time for the user to arrive on time. The computing device may dynamically monitor the conditions for the one or more recommended routes for the user to take and readjust the estimate for the travel time based on the route conditions. For example, if an accident occurs on the route, the computing device may generate a revised notification indicating to the user to leave sooner than the original recommended departure time such that the user will arrive at the destination on time.

The notification displayed or otherwise indicated to the user may indicate any factors considered in generating the estimate for the estimated travel time to the destination. For example, the notification may indicate road conditions (e.g., traffic accidents, backups, road construction, weather conditions, and the like), whether the driver is expected to stop for fuel (e.g., refuel indicator 415) or to charge the vehicle's batteries (e.g., recharge indicator 420) and/or the accompanying time estimate to add fuel or charge batteries, and/or whether the trip duration has been adjusted (and/or by how much) based on the driver's historical driving speed and/or level or riskiness (e.g., driving characteristics indicator 425).

In step 235, the computing device may determine a property of insurance associated with the driving trip. The property of insurance may include any of a number of aspects of a vehicle insurance policy. For example, a property of the insurance may include a premium, a deductible, a coverage term, a coverage amount, or other attribute of an insurance policy. The property may include a risk score associated with the driver and/or the driving trip. In some aspects, the property of insurance may comprise a baseline value for the property of insurance. As will be described in further detail below, the computing device may adjust the value of the property of insurance based on various factors, including the driver's departure time, arrival time, and driving telematics during the trip.

Figure 5:
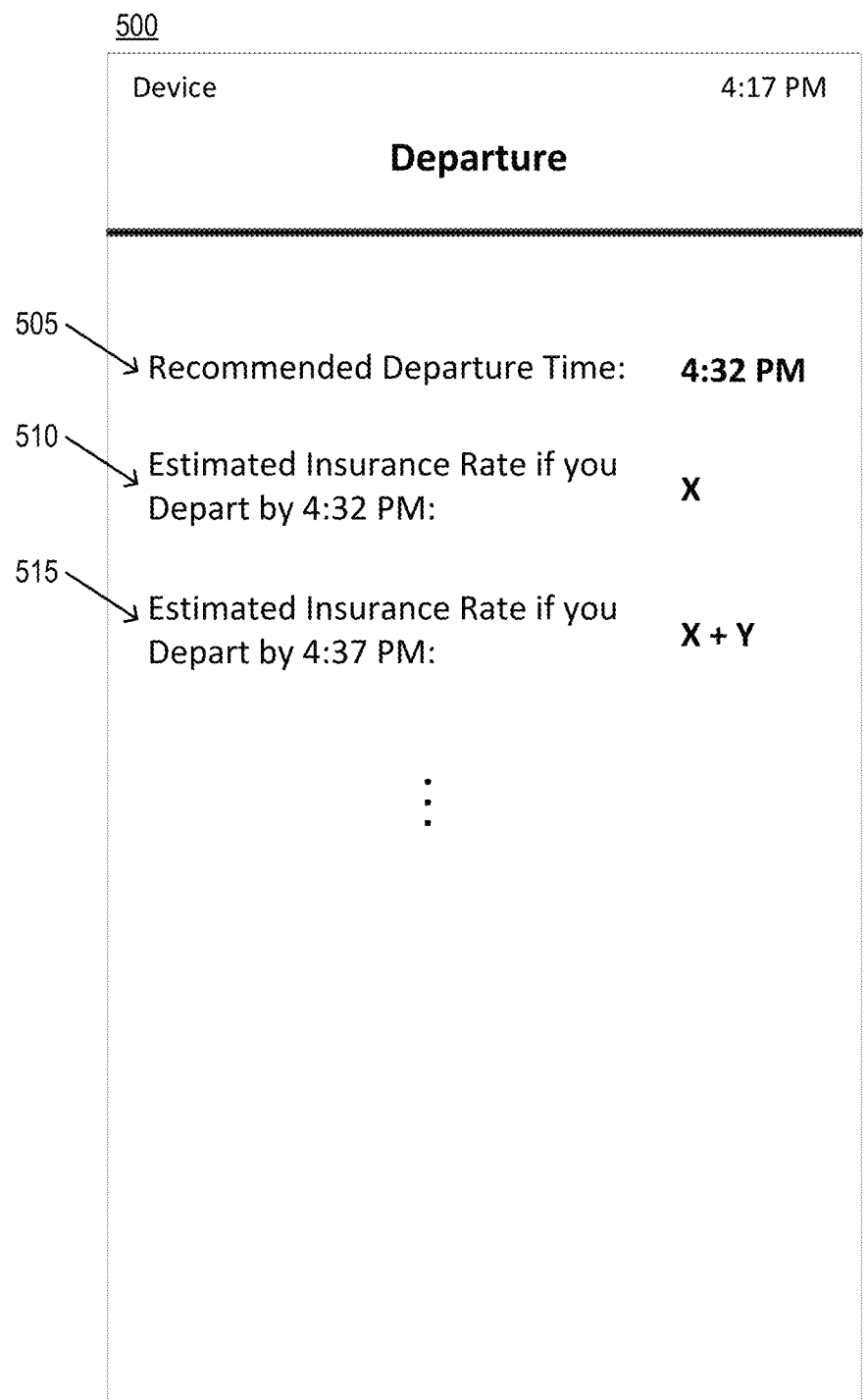
FIG. 5 illustrates an example of a user interface for displaying a property of an insurance policy according to one or more aspects of the disclosure.

In step 240, the computing device may generate a notification of the property of insurance and indicate the property of insurance to the user, such as before the driver leaves for the destination. The computing device may also indicate how the property of insurance may change based on, for example, when the driver departs for the destination. FIG. 5 illustrates an example of a user interface 500 for displaying a property of an insurance policy according to one or more aspects of the disclosure. The user interface 500 may indicate the recommended departure time 505. The notification may also indicate to the driver that an insurance rate is X if the driver leaves at the recommended departure time (e.g., 510) and/or indicate to the driver that the insurance rate is X+Y if the driver leaves later than the recommended departure time (e.g., 5 minutes later) (e.g., 515). The notification may indicate any number of other insurance rates for different departure times.

In step 245, the computing device may determine whether the user has departed for the destination. For example, the computing device may receive sensor data from sensors of the mobile device 110 and/or sensors of the vehicle 120 to determine if the driver has left. Exemplary sensor data include speed data (e.g., from a speedometer of the mobile device 110 or the vehicle 120), acceleration data (e.g., from an accelerometer of the mobile device 110 or the vehicle 120), vehicle operation data (e.g., from a microcomputer of the vehicle 120), rotational data (e.g., from a gyroscope of the mobile device 110 or the vehicle 120), GPS data (e.g., from a GPS device of the mobile device 110 or the vehicle 120), cellular or other wireless data (e.g., from a transceiver of the mobile device 110 or the vehicle 120), or any other sensor data that can be processed to determine whether the driver has departed for the destination. If the driver has not departed (step 245: N), the computing device may wait to detect a departure. If the driver has departed (step 245: Y), the computing device may proceed to step 250.

In step 250, the computing device may adjust the property of insurance based on the driver's departure time determined in step 245. The computing device may compare the driver's actual departure time sensed by one or more sensors of the mobile device 110 or vehicle 120 to the recommended departure time determined in step 225. Assume, for example, that the property of insurance comprises an insurance premium for the driver and/or vehicle. If the driver departs for the destination at or before the recommended departure time, the computing device may decrease the driver's insurance premium by a certain amount or keep the insurance premium at the same level. If the driver departs after the recommended departure time, the computing device may increase the driver's insurance premium by a certain amount. As another example, assume that the property of insurance comprises a risk score for the driver. If the driver departs before the recommended departure time, the computing device may increase the driver's risk score by a certain amount (e.g., with a higher risk score indicating a safer driver) or decrease the driver's risk score in arrangements in which a higher risk score indicates a riskier driver. If the driver departs at or within a threshold of the recommended departure time, the computing device may maintain the driver's risk score. If the driver departs after the recommended departure time, the computing device may decrease the driver's risk score by a certain amount (e.g., in arrangements in which a higher risk score indicates a safer driver) or may increase the risk score (e.g., in arrangements in which a higher risk score indicates a riskier or less safe driver). That is, the computing device may be configured to reward or otherwise incentivize the driver to leave on time or early. If the driver leaves late, the potential for speeding or other risks may increase and a cost or other property or factor associated with insurance may be adjusted accordingly.

In step 255, the computing device may determine whether the driver has arrived at the destination determined in step 205. The computing device may make the determination in a similar manner as the determination in step 245, such as based on sensor data from one or more sensors of the mobile device 110 or vehicle 120. If the computing device determines that the user has arrived at the destination (step 255: Y), the computing device may proceed to step 285, as will be described in further detail below. If the computing device determines that the user has not arrived at the destination (step 255: N), the computing device may proceed to step 260.

In step 260, the computing device may monitor the driver's driving behavior during the trip. For example, the computing device may monitor the vehicle's speed based on sensor data from sensors of the mobile device 110 and/or sensors of the vehicle 120, such as speedometer data, accelerometer data, GPS data, cellular or other wireless data, and the like. The computing device may determine the speed limit for each portion of the driver's route, such as by querying one or more internal or external database (e.g., database 152 or database 140) having the speed limit data. The computing device may compare the vehicle's speed during the trip to the speed limit of that particular portion traveled by the vehicle.

The computing device may additionally or alternatively determine if the driver is taking the route determined, for example, in step 215 or if the driver is taking a different route (e.g., deviating from the suggested route). The computing device may similarly determine how much of the suggested route the driver is taking, such as 70% of the suggested route or seven miles out of a ten mile long suggested route. The computing device may additionally or alternatively determine whether the driver is taking at least a portion of the suggested route and/or how much of the portion of the suggested route the driving is taking. The computing device may additionally or alternatively determine the number of times that the driver deviated from the proposed route, or some other metric based on deviation from the route. Examples of such metrics include, but are not limited to, the number of deviations (e.g., in total), the number of deviations per time, the number of deviations per mile, the cost in time of each deviation as proposed by routing software versus the expected trip travel time (e.g., as a percentage), the cost in time of each deviation as a percentage of how much of an early arrival time buffer they have, etc. The actual route taken by the driver may be determined using data from position sensors within the car, such as cellular position data, GPS data, Wi-Fi data, and the like. The position sensors may be integrated with the car or may be in a separate device within the car, such as the driver's smartphone, tablet, smartwatch, or other device.

In some aspects, the computing device may re-determine the suggested route while the driver is traveling to the destination based on changing conditions (e.g., weather conditions, accidents, congestion, unexpected road closures, malfunctioning traffic signals, and the like). The computing device may cause (e.g., by sending an instruction to) a display device in the vehicle, such as the driver's smartphone or the vehicle's display, to display the new route. Similar to determining whether the driver took the original suggested route, the computing device may determine whether the driver is taking the new suggested route. The computing device may also determine the number of times that the driver deviated from the suggested route. As will be described in further detail below, the computing device may adjust a property of the driver's insurance based on whether the driver took the suggested route(s) and/or the number of times the driver deviated from the suggested route.

During the trip, the computing device may generate one or more notifications for the user. For example, the computing device may generate a notification if the vehicle is travelling too slowly or inefficiently (e.g., a wrong route) to arrive at the destination on time. The computing device may similarly generate a notification if the vehicle is exceeding the speed limit. The computing device may generate an estimate for the driver's arrival time based on the vehicle's actual speed and, for example, not based on the prevailing speed limit.

Figure 6:
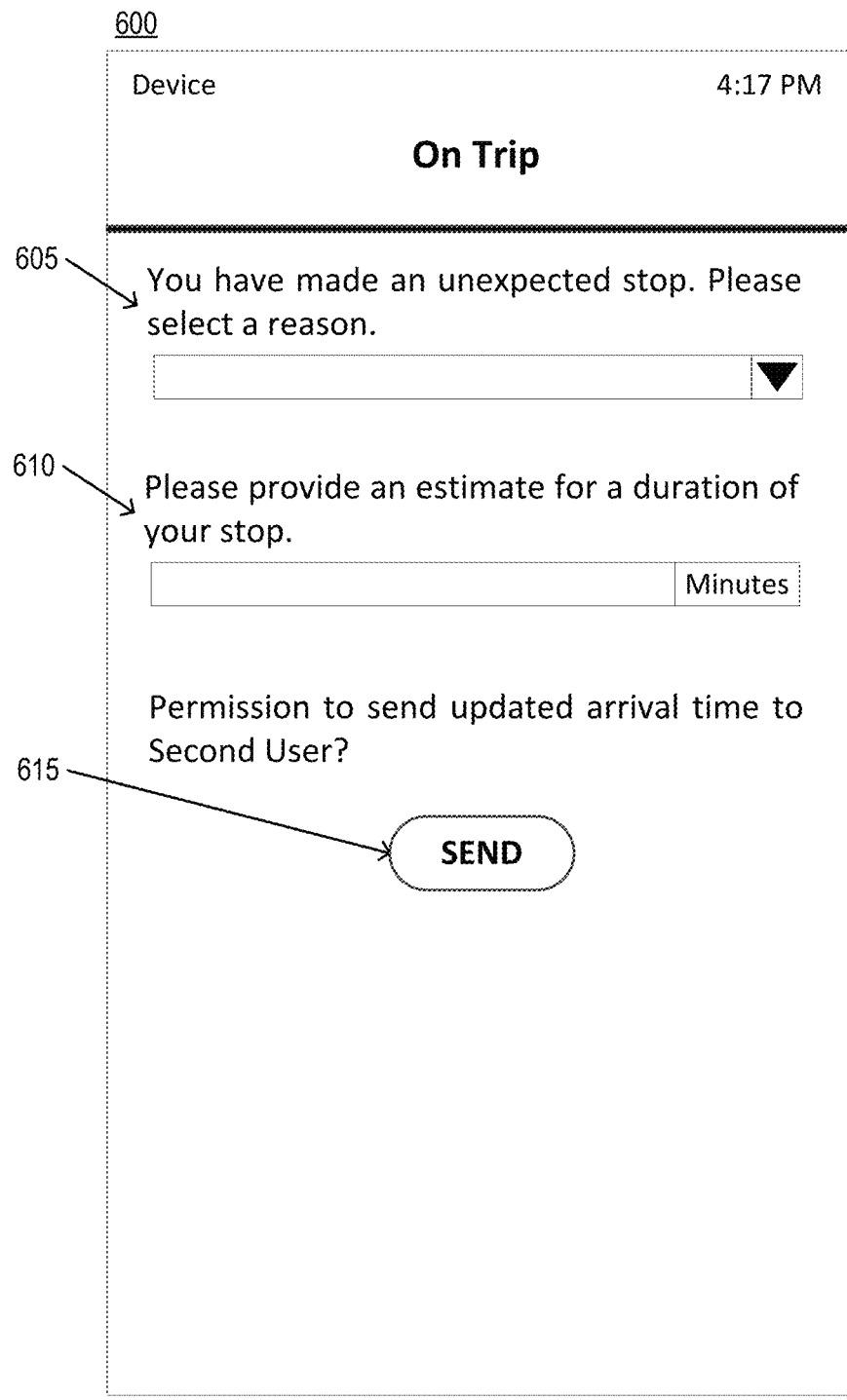
FIG. 6 illustrates an example of a user interface for displaying information for an unexpected stop according to one or more aspects of the disclosure.

FIG. 6 illustrates an example of a user interface 600 for displaying information for an unexpected stop according to one or more aspects of the disclosure. If the vehicle stops for an unknown reason (e.g., an unplanned stop, such as to refuel), the driving application on the user's mobile device 110 may generate and display a user interface requesting the driver to provide a reason for the stop (e.g., via a dropdown or other graphical user interface element 605) and/or an estimated duration of the stop (e.g., element 610). After receiving the information from the driver via the application, the computing device may determine the effect of the stop on the driver's estimated arrival time. The effect may be displayed on the mobile device 110 or otherwise indicated to the driver. The computing device may request the driver's permission to generate and send a notification to a second device, such as a device of a user at the destination (e.g., element 615).

In step 265, the computing device may adjust the property of insurance based on the user's driving characteristics (e.g., speed, whether the driver took the suggested route(s), etc.) during the trip. For example, the computing device may increase an insurance premium or decrease a risk score associated with the driver if the vehicle's speed exceeds the speed limit. Similarly, the computing device may decrease the driver's insurance premium or increase the risk score if the driver drives at or below the speed limit. That is, the driver may be given a discount if the driver does not speed or may be charged extra if the driver does speed. Additionally or alternatively, the computing device may increase an insurance premium or decrease a risk score associated with the driver if the driver did not take the suggested route(s) (and/or took less than a threshold portion of the suggested route(s), such as less than 70% of the suggested route). Similarly, the computing device may decrease the driver's insurance premium or increase the risk score if the driver took the suggested route(s) (and/or took more than a threshold portion of the suggested route(s), such as more than 70% of the suggested route). That is, the driver may be given a discount if the driver took the suggested route or may be charged extra if the driver did not take the suggested route. The insurance premium or risk score may similarly be adjusted based on the number of times that the driver deviated from the suggested route, or some other metric based on deviation from the suggested route. Accordingly, the computing device may be used to prevent unsafe driving behavior and encourage safe driving behavior during the trip.

In some aspects, a deviation from the suggested driving route might not necessarily indicate unsafe driving. For example, the driver may observe a situation in front of the driver (e.g., an accident, heavy traffic, emergency lights, etc.), but the routing system might not yet have enough and/or timely information to re-route the driver to avoid the situation. A deviation from the suggested route might be warranted in some of these instances because the deviated routes may be safer and/or faster. For example, another driver traveling down the same road to the same destination at a later time (e.g., 7 minutes later) may have received a route update to change course similar to the deviated route that the initial driver made.

In order to account for these situations, the computing device may compare deviations from the suggested route against road conditions determined at each deviation point for a period of time after the driver was at that point. For example, the computing device may determine the period of time to be 10 minutes, 15 minutes, or another time period after the driver made the deviation from the route guidance. The computing device may determine (e.g., identify) one or more updated routes during the time period. The updated routes may comprise routes that other drivers took during the time period (e.g., for drivers with the same destination and/or same portion of road traveled) or may comprise updated routes that the computing device would have recommended to the driver had timely updated traffic data been available to the system (e.g., hypothetical routes). If the computing device determines that the driver's deviation matches a part of the updated route (and/or the entire update route), the computing device might not increase the insurance premium or decrease the risk score associated with the driver, even though the driver did not take the recommended route(s) or portions thereof.

The time period for comparing the driver's deviations to updated route guidance may be proportional to the amount of traffic the system observes on each road segment. The greater the amount of traffic, the shorter the time period might be (and vice versa). On a road where the routing system is receiving a lot of traffic data, the system can typically react more quickly than on a road with little traffic (e.g., a side road) where the system might not be able to react as quickly.

In step 270, the computing device may determine whether the driver is late (e.g., whether the current time exceeds the desired arrival time at the destination, which may have been determined in step 205) or is estimated to be late. If the driver is not late or not estimated to be late (step 270: N), the computing device may return to step 255 to determine whether the driver has arrived at the destination. If the driver is late or is estimated to be late (step 270: Y), the computing device may proceed to step 275.

In step 275, the computing device may generate a notification for the driver and/or for another user (e.g., a user at the destination) indicating that the driver will be late. The notification may also indicate the amount of time that the driver is expected to be late (e.g., 5 minutes late, 7 minutes late, etc.). In some aspects, the user at the destination may have a mobile device or other user device 130 configured to receive notifications associated with the driver's estimated arrival time. A text message, email message, in-app message, and the like may be sent to the device 130. For example, if the driver is driving to a doctor's appointment, the device 130 may comprise a device at the location of the doctor's office. Accordingly, the doctor's office may be notified if the driver is expected to be late for his or her appointment. In some aspects, the notification may indicate a reason that the driver is expected to be late. For example, a traffic accident (or another situation outside of the driver's control) may have unexpectedly occurred during the driver's trip. The notification may indicate to the user that the driver may be delayed due to a traffic accident and that the delay is not the driver's fault.

An application, such as a driving application installed on the driver's mobile device 110 or other device 160, may display a user interface requesting information about whom to notify if the driver is expected to be late to the destination. The contact information for the user(s) to notify may be retrieved from a contacts list accessible to the mobile device 110 or other device 160.

In step 280, the computing device may adjust a property of insurance associated with the driver based on the late arrival or anticipated late arrival. For example, the driver's insurance premium may be increased or the driver's risk score may be decreased. The computing device may additionally or alternatively adjust a property of insurance based on whether the driver decided to notify the user at the destination that the driver will be late (and by how much). For example and with reference to FIG. 6, the computing device may determine whether the driver selected the option 615 to send a notification to the second user at the destination that the driver will be late and by how much. As will be described in further detail below, the property of insurance may be adjusted on an on-occasion bases (e.g., for each trip) or at one time based on several occasions. The computing device may return to step 255 to determine whether the user has arrived at the destination.

In step 285, the computing device may adjust a property of insurance associated with the driver based on monitored driving habits, whether the user departs an origin late, and/or whether the user arrives at the destination late. The driver may be rewarded or penalized on an on-occasion basis (e.g., each driving trip) or at one time based on several occasions. For example, if the driver habitually arrives at each destination late, an overall cost (e.g., insurance premium) may be increased for the driver. Similarly, if the driver habitually departs late, the driver's insurance premium may be increased. In some aspects, if a driver habitually leaves late and arrives on time, the rate may nevertheless be increased because the driver may have been speeding to arrive at the destination on time.

The property of insurance may be adjusted positively based on good driving habits, whether the driver habitually departs an origin early or on time, and/or whether the driver habitually arrives at the destination early or on time. For example, insurance discounts, cash rewards, or other rewards may be provided to the driver based on good habits. In some aspects, the computing device may generate weekly or monthly summaries of trips taken by the driver. The trips may be classified by trip reasons. Various characteristics of the trips may be recorded and/or displayed, such as the amount of time that the driver arrived early or late, the number of rule violations by trip reason, typical trip delay reasons (e.g., external, such as a traffic jam, or internal, such as an empty gas tank).

An application on the driver's mobile device 110 and/or other user device 160 may be used to generate trip recommendations for the driver. The trip recommendations may be based on inputs, such as a type of scenery the driver desires, the time that the driver desires to return to an origin or to arrive at a different destination, the amount of traffic the driver can handle (e.g., traffic speed, road construction, and the like), etc. That is, the application may be used as a trip planning application. The user may indicate the type of scenery desired for the destination or for the route to the destination. The user may also indicate a minimum level of user rating for the destination or route (e.g., at least four out of five stars or five out of five stars). Similarly, the user may indicate when the user desires to return, such as by 5 PM. The user may also indicate the type of traffic the user can handle. Based on the user's inputs into the application, the mobile device 110, user device 160, or other computing device may generate a recommendation for a destination and/or the route for the user to take to the destination. The computing device may recommend, for example, a route with nice scenery or low traffic, rather than the fastest route.

Figure 3:
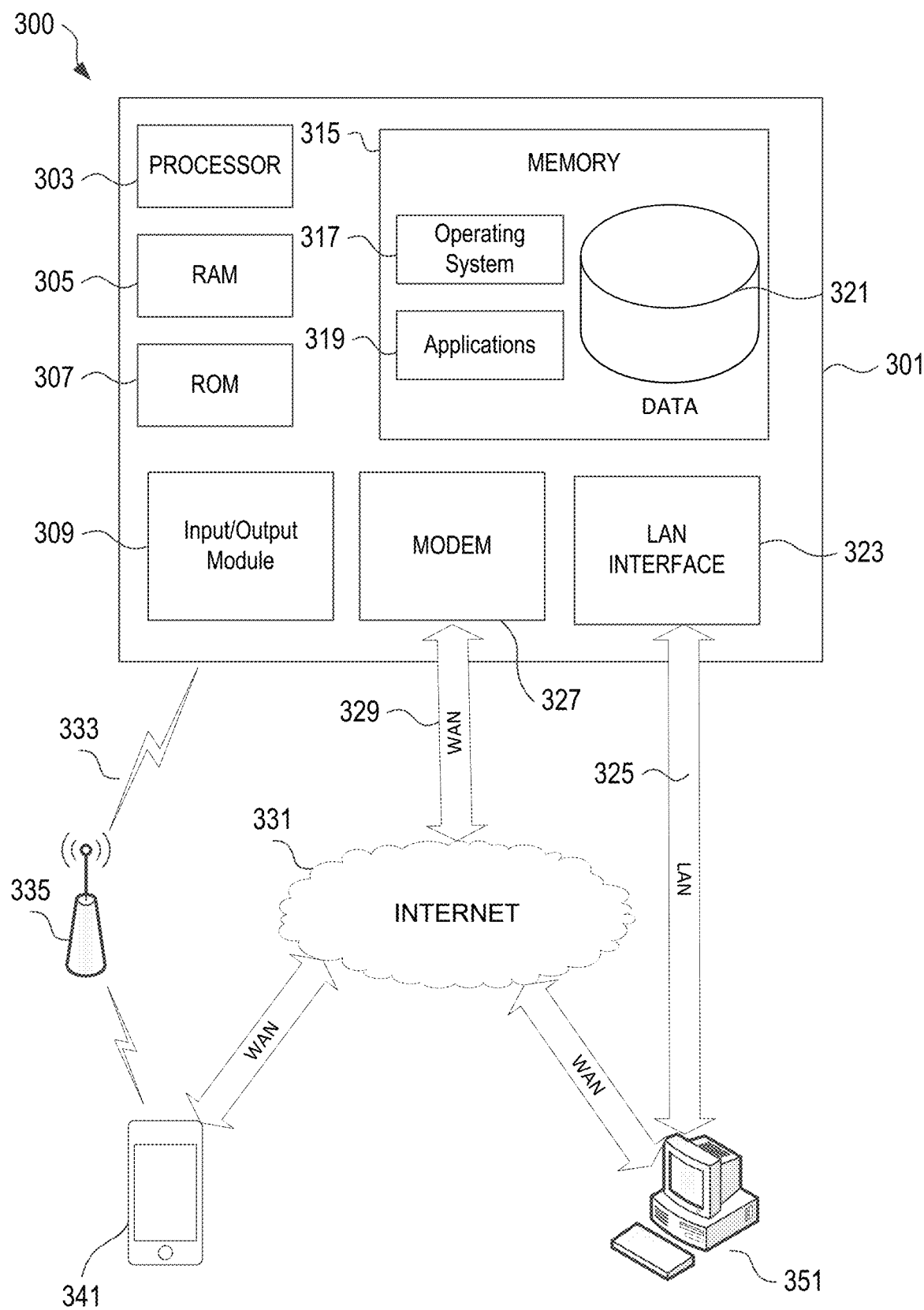
FIG. 3 illustrates a network environment and computing systems that may be used to implement aspects of the disclosure.

FIG. 3 illustrates a block diagram of a computing device 301 in a driver characteristic monitoring system 300 that may be used according to one or more illustrative embodiments of the disclosure. The computing device 301 may have a processor 303 for controlling overall operation of the computing device 301 and its associated components, including RAM 305, ROM 307, input/output module 309, and memory unit 315. The computing device 301, along with one or more additional devices (e.g., terminals 341, 351) may correspond to any of multiple systems or devices, such as driver characteristic monitoring devices or systems, configured as described herein for determining departure times, arrival times, and/or other driving characteristics based on sensor data.

Input/Output (I/O) module 309 may include a microphone, keypad, touch screen, and/or stylus through which a user of the computing device 301 may provide input, and may also include one or more of a speaker for providing audio input/output and a video display device for providing textual, audiovisual and/or graphical output. Software may be stored within memory unit 315 and/or other storage to provide instructions to processor 303 for enabling device 301 to perform various functions. For example, memory unit 315 may store software used by the device 301, such as an operating system 317, application programs 319, and an associated internal database 321. The memory unit 315 includes one or more of volatile and/or non-volatile computer memory to store computer-executable instructions, data, and/or other information. Processor 303 and its associated components may allow the computing device 301 to execute a series of computer-readable instructions to determine departure times, arrival times, and/or other driving characteristics based on sensor data.

The computing device 301 may operate in a networked environment 300 supporting connections to one or more remote computers, such as terminals/devices 341 and 351. The computing device 301, and related terminals/devices 341 and 351, may include devices installed in ground, air, or space vehicles or mobile devices that are configured to receive and process image and external data. Thus, the computing device 301 and terminals/devices 341 and 351 may each include personal computers (e.g., laptop, desktop, or tablet computers), servers (e.g., web servers, database servers), vehicle-based devices (e.g., on-board vehicle computers, short-range vehicle communication systems, sensors and telematics devices), or mobile communication devices (e.g., mobile phones, portable computing devices, and the like), and may include some or all of the elements described above with respect to the computing device 301. The network connections depicted in FIG. 3 include a local area network (LAN) 325 and a wide area network (WAN) 329, and a wireless telecommunications network 333, but may also include other networks. When used in a LAN networking environment, the computing device 301 may be connected to the LAN 325 through a network interface or adapter 323. When used in a WAN networking environment, the device 301 may include a modem 327 or other means for establishing communications over the WAN 329, such as network 331 (e.g., the Internet). When used in a wireless telecommunications network 333, the device 301 may include one or more transceivers, digital signal processors, and additional circuitry and software for communicating with wireless computing devices 341 (e.g., mobile phones, short-range vehicle communication systems, vehicle sensing and telematics devices) via one or more network devices 335 (e.g., base transceiver stations) in the wireless network 333.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, LTE, Wi-Fi, and WiMAX, is presumed, and the various computing devices and driver characteristic monitoring system components described herein may be configured to communicate using any of these network protocols or technologies.

Additionally, one or more application programs 319 used by the computing device 301 may include computer executable instructions (e.g., driver characteristic monitoring algorithms, and the like) for determining departure times, arrival times, and/or other driving characteristics based on sensor data.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. A method comprising:
    establishing, by a driving characteristic computing device and via a wireless or a wired network, communication with one or more sensors of a vehicle;
    receiving, from the one or more sensors, sensor data;
    determining an origin of a trip associated with a user associated with the vehicle, a destination of the trip associated with the user, and a desired arrival time at the destination of the trip;
    determining, by the driving characteristic computing device and based on the sensor data, one or more of a fuel level of the vehicle or a battery level of the vehicle;
    based on the one or more of the fuel level of the vehicle or the battery level of the vehicle and the desired arrival time at the destination, determining, by the driving characteristic computing device, a recommended departure time from the origin for the user, wherein determining the recommended departure time comprises:
        in response to determining that the one or more of the fuel level of the vehicle or the battery level of the vehicle is less than a threshold, determining that the vehicle will stop during the trip for refueling or recharging, and
        determining, based on the determining that the vehicle will stop during the trip for refueling or recharging, the recommended departure time;
    determining, based on the sensor data, a departure time from the origin for the user;

comparing, by the driving characteristic computing device, the departure time to the recommended departure time;

determining a value of a property of insurance for the user based on the comparing the departure time to the recommended departure time;

prior to the recommended departure time, generating a notification for the user of a first value of the property of insurance if the user departs the origin at or before the recommended departure time and a second value of the property of insurance if the user departs the origin after the recommended departure time;

determining, based on user input in response to an option presented to the user, that the user provides permission to send a notification indicating that the user will arrive at the destination later than the desired arrival time prior to sending the notification; and adjusting, based on the user providing the user permission to send the notification indicating that the user will arrive at the destination later than the desired arrival time, the value of the property of insurance for the user.

2. The method of claim 1, wherein:

determining the value of the property of insurance comprises increasing the value of the property of insurance in response to determining that the departure time is after the recommended departure time; or determining the value of the property of insurance comprises decreasing the value of the property of insurance in response to determining that the departure time is at or prior to the recommended departure time.

3. The method of claim 1, wherein the property of insurance comprises a risk score or an insurance premium associated with the user.

4. The method of claim 1, further comprising:

sending, by the driving characteristic computing device, to a user device associated with the user, and via a user interface of a driving application running on the user device, a permission request for a user permission to send a notification indicating that the user will arrive at the destination later than the desired arrival time; and receiving, based on the permission request and via the user interface of the driving application running on the user device, a user input indicating the user permission to send the notification, wherein the user input comprises a user interaction with a button displayed on the user interface of the driving application.

5. The method of claim 1, further comprising:

determining at least a portion of a recommended driving route for the trip;

determining, based on position sensor data, at least a portion of a driving route taken by the user; and comparing, by the driving characteristic computing device, the at least the portion of the recommended driving route to the at least the portion of the driving route taken by the user.

6. The method of claim 5, wherein determining the value of the property of insurance for the user is further based on the comparing the at least the portion of the recommended driving route to the at least the portion of the driving route taken by the user.

7. The method of claim 1, further comprising:

determining, based on sensor data, an arrival time of the user at the destination; and comparing the arrival time to the desired arrival time at the destination, wherein the determining the value of the property of insurance for the user is further based on the comparing the arrival time to the desired arrival time.

8. An apparatus comprising:

a processor; and non-transitory memory storing computer-executable instructions that, when executed by the processor, cause the apparatus to:

establish, via a wireless or a wired network, communication with one or more sensors of a vehicle;

receive sensor data corresponding to the vehicle;

determine an origin of a trip associated with a user associated with the vehicle, a destination of the trip associated with the user, and a desired arrival time at the destination of the trip;

determine, based on the sensor data, one or more of a fuel level of the vehicle or a battery level of the vehicle;

based on the one or more of the fuel level of the vehicle or the battery level of the vehicle and the desired arrival time at the destination, determine a recommended departure time from the origin for the user, wherein determining the recommended departure time comprises:

in response to determining that the one or more of the fuel level of the vehicle or the battery level of the vehicle is less than a threshold, determining that the vehicle will stop during the trip for refueling or recharging, and determining, based on the determining that the vehicle will stop during the trip for refueling or recharging, the recommended departure time;

determine, based on the sensor data, a departure time from the origin for the user;

compare the departure time to the recommended departure time;

determine a value of a property of insurance for the user based on the comparing the departure time to the recommended departure time;

generate a notification for the user of a first value of the property of insurance if the user departs the origin at or before the recommended departure time and a second value of the property of insurance if the user departs the origin after the recommended departure time;

determine, based on user input in response to an option presented to the user, that the user provides permission to send a notification indicating that the user will arrive at the destination later than the desired arrival time prior to sending the notification; and adjust, based on the user providing the user permission to send the notification indicating that the user will arrive at the destination later than the desired arrival time, the value of the property of insurance for the user.

9. The apparatus of claim 8, wherein the property of insurance comprises a risk score or an insurance premium associated with the user.

10. The apparatus of claim 8, wherein the computer-executable instructions, when executed by the processor, further cause the processor to:

send to a user device associated with the user, and via a user interface of a driving application running on the user device, a permission request for a user permission to send a notification indicating that the user will arrive at the destination later than the desired arrival time; and receive, based on the permission request and via the user interface of the driving application running on the user device, a user input indicating the user permission to send the notification, wherein the user input comprises a user interaction with a button displayed on the user interface of the driving application.

11. The apparatus of claim 8, wherein the computer-executable instructions, when executed by the processor, further cause the processor to:
   determine at least a portion of a recommended driving route for the trip;
   determine, based on position sensor data, at least a portion of a driving route taken by the user; and
   compare the at least the portion of the recommended driving route to the at least the portion of the driving route taken by the user.

12. The apparatus of claim 11, wherein determining the value of the property of insurance for the user is further based on the comparing the at least the portion of the recommended driving route to the at least the portion of the driving route taken by the user.

13. The apparatus of claim 8, wherein the computer-executable instructions, when executed by the processor, further cause the processor to:
   determine, based on sensor data, an arrival time of the user at the destination; and
   compare the arrival time to the desired arrival time at the destination,
   wherein the determining the value of the property of insurance for the user is further based on the comparing the arrival time to the desired arrival time.

14. A non-transitory, computer readable medium storing computer-readable instructions that, when executed, cause a driving characteristic computing device to:
   establish, via a wireless or a wired network, communication with one or more sensors of a vehicle;
   receive sensor data corresponding to the vehicle;
   determine an origin of a trip associated with a user associated with the vehicle, a destination of the trip associated with the user, and a desired arrival time at the destination of the trip;
   determine, based on the sensor data, one or more of a fuel level of the vehicle or a battery level of the vehicle;
   based on the one or more of the fuel level of the vehicle or the battery level of the vehicle and the desired arrival time at the destination, determine a recommended departure time from the origin for the user, wherein determining the recommended departure time comprises:
      in response to determining that the one or more of the fuel level of the vehicle or the battery level of the vehicle is less than a threshold, determining that the vehicle will stop during the trip for refueling or recharging, and
      determining, based on the determining that the vehicle will stop during the trip for refueling or recharging, the recommended departure time;
   determine, based on the sensor data, a departure time from the origin for the user;
   compare the departure time to the recommended departure time;
   determine a value of a property of insurance for the user based on the comparing the departure time to the recommended departure time;
   generate a notification for the user of a first value of the property of insurance if the user departs the origin at or before the recommended departure time and a second value of the property of insurance if the user departs the origin after the recommended departure time;
   generate an option to send a notification indicating that the user will arrive at the destination later than the desired arrival time;
   determine, based on whether the user selected the option, that the user permits sending of the notification prior to sending the notification; and
   adjust, based on the user providing the user permission to send the notification indicating that the user will arrive at the destination later than the desired arrival time, the value of the property of insurance for the user.

15. The non-transitory, computer readable medium of claim 14, wherein the property of insurance comprises a risk score or an insurance premium associated with the user.

16. The non-transitory, computer readable medium of claim 14, wherein the computer-readable instructions, when executed, further cause the driving characteristic computing device to:
   send to a user device associated with the user, and via a user interface of a driving application running on the user device, a permission request for a user permission to send a notification indicating that the user will arrive at the destination later than the desired arrival time; and
   receive, based on the permission request and via the user interface of the driving application running on the user device, a user input indicating the user permission to send the notification, wherein the user input comprises a user interaction with a button displayed on the user interface of the driving application.

17. The non-transitory, computer readable medium of claim 14, wherein the computer-readable instructions, when executed, further cause the driving characteristic computing device to:
   determine at least a portion of a recommended driving route for the trip;
   determine, based on position sensor data, at least a portion of a driving route taken by the user; and
   compare the at least the portion of the recommended driving route to the at least the portion of the driving route taken by the user.

18. The non-transitory, computer readable medium of claim 17, wherein determining the value of the property of insurance for the user is further based on the comparing the at least the portion of the recommended driving route to the at least the portion of the driving route taken by the user.

19. The non-transitory, computer readable medium of claim 14, wherein determining that the user permits sending of the notification indicating that the user will arrive at the destination later than the desired arrival time includes receiving user input with an indication of user permission.

20. The non-transitory, computer readable medium of claim 14, wherein the sensor data is received from the one or more sensors of the vehicle.

* * * * *